(12) United States Patent
Gaedke et al.

(10) Patent No.: US 7,586,945 B2
(45) Date of Patent: Sep. 8, 2009

(54) METHOD FOR RESERVING ISOCHRONOUS RESOURCES IN A WIRELESS NETWORK

(75) Inventors: Klaus Gaedke, Hannover (DE); Sébastien Perrot, Rennes (FR); Gilles Straub, Acigné (FR)

(73) Assignee: Thomson Licensing, Boulogne Billancourt (FR)

(*) Notice: Subject to any disclaimer, the term of this patent is extended or adjusted under 35 U.S.C. 154(b) by 1050 days.

(21) Appl. No.: 10/276,188

(22) PCT Filed: May 15, 2001

(86) PCT No.: PCT/EP01/05571

§ 371 (c)(1),
(2), (4) Date: Nov. 13, 2002

(87) PCT Pub. No.: WO01/89153

PCT Pub. Date: Nov. 22, 2001

(65) Prior Publication Data

US 2003/0152100 A1    Aug. 14, 2003

(30) Foreign Application Priority Data

May 15, 2000  (EP)  .................. 00401324

(51) Int. Cl.
*H04J 3/16* (2006.01)
(52) U.S. Cl. ...................... 370/468; 370/442
(58) Field of Classification Search ............... 370/252, 370/401, 442, 465, 468, 473, 474
See application file for complete search history.

(56) References Cited

U.S. PATENT DOCUMENTS

| | | | |
|---|---|---|---|
| 5,960,053 A * | 9/1999 | Seo et al. ................... 377/54 |
| 6,108,336 A * | 8/2000 | Duault et al. ............ 370/395.6 |
| 6,185,607 B1 * | 2/2001 | Lo et al. .................... 709/213 |
| 6,493,769 B1 * | 12/2002 | Kawamura et al. ............ 710/3 |
| 6,505,034 B1 * | 1/2003 | Wellig ......................... 455/69 |
| 6,529,522 B1 * | 3/2003 | Ito et al. ..................... 370/466 |
| 6,654,363 B1 * | 11/2003 | Li et al. ...................... 370/338 |
| 7,032,024 B1 * | 4/2006 | Park .......................... 709/227 |

FOREIGN PATENT DOCUMENTS

AL    0971509    1/2000

OTHER PUBLICATIONS

R.H.J. Bloks "The IEEE-1394 High Speed Serial Bus", Philips Journal of Research, Elsevier, Amsterdam, NL, vol. 50, No. 1/2, Jul. 1, 1996, pp. 209-216.
J. K. Jush et al "ETSI Project BRAN HIPERLAN Type 2 for IEEE 1394 Applications System Overview", IEEE P1394.1 Group Meeting, Online Oct. 14, 1999, pp. 1-18.

* cited by examiner

*Primary Examiner*—Ricky Ngo
*Assistant Examiner*—Christine Ng
(74) *Attorney, Agent, or Firm*—Robert D. Shedd; Paul P. Kiel

(57) ABSTRACT

Method for reserving isochronous resources in a wireless network comprising at least a wireless source device and a wireless sink device, said wireless network being based on a TDMA frame transmission scheme, said method comprising the steps of:
  providing an output plug in said wireless source device, said output plug being associated with an output plug register, wherein said output plug register defines a maximum amount of data output by said output plug during a wireless frame;
  reserving an amount of bandwidth corresponding to said maximum amount of data to be sent in a wireless frame with an isochronous resource manager of the wireless network.

9 Claims, 2 Drawing Sheets

| On-line | Broadcast connection counter | Point to point connection counter | Reserved | Channel number | Data rate | Overhead ID | Payload |
|---|---|---|---|---|---|---|---|
| 1 | 1 | 6 | 2 | 6 | 2 | 4 | 10 |

Fig. 3
(Prior Art)

| On-line | Broadcast connection counter | Point to point connection counter | Channel number | Overhead ID | Payload |
|---|---|---|---|---|---|
| 1 | 1 | 6 | 6 | 4 | 14 |

Fig. 4

METHOD FOR RESERVING ISOCHRONOUS RESOURCES IN A WIRELESS NETWORK

This application claims the benefit, under 35 U.S.C. §365 of International Application PCT/EP01/05571, filed May 15, 2001, which was published in accordance with PCT Article 21(2) on Nov. 22, 2001 in English and which claims the benefit of European patent application No. 00401324.9 filed May 15, 2000.

The invention concerns a method for reserving isochronous resources in a wireless network. It applies in particular to a HIPERLAN 2 network in which devices comprise an IEEE1394 Convergence Layer.

The documents IEC 61883 parts 1 to 5 define a digital interface for 10 audio and video devices in a network based on the IEEE 1394 wired bus. In particular, these documents describe registers and packet formats to be used in conjunction with the isochronous resource reservation mechanism defined by IEEE 1394.

IEC 61883-1 defines an isochronous packet ('Source packet') which encapsulates the audio/video stream data to be transmitted. An isochronous source packet is split into one or more data blocks for insertion into IEEE 1394 isochronous packets ('Bus packets'). Depending on the available bandwidth, one or more data blocks may be inserted into a bus packet. A bus packet may also remain empty if no data blocks are available.

Special purpose registers ('Plug registers') are defined in the source and sink devices. An output plug control register (OPCR) is defined for every output (source) plug, while an input plug control register (iPCR) is defined for every input (sink) plug. A device may have several of each plugs. In particular, each plug control register defines the number of quadlets which may be provided by a source or absorbed by a sink, per isochronous packet.

When an IEEE 1394 controller reserves isochronous bandwidth, it will make this reservation for the maximum bandwidth defined by the plug control registers. The maximum bandwidth is expressed as the maximum number of quadlets a source device may send during a bus cycle of 125 µs. This reservation is valid for every cycle, meaning that even if no data blocks are sent during one cycle, this bandwidth is lost because it is not available to other devices.

The ETSI BRAN HIPERLAN 2 draft standard aims at defining a high-speed local area network for multimedia applications. It has been proposed to use HIPERLAN 2 to interconnect IEEE 1394 busses or IEEE1394 devices. An IEEE 1394 specific convergence sub-layer is thus required for HIPERLAN 2, in order to act as an interface for 1394 devices and to provide the services of an IEEE 1394 link layer.

HIPERLAN 2 is based on a TDMA/TDD (Time Division Multiple Access/Time Division Duplex) scheme, in which the TDMA frame has a periodicity of 2 ms.

Since bandwidth reservation according to the IEC 61883 rules may only be made in discrete steps (1.5, 3, 6, 12, 24, 36 . . . Mbit/s), whatever the real bandwidth required, applying these rules to the HIPERLAN 2 ms frame would result in a loss of bandwidth efficiency, compared to a finer scheme. For example, if an MPEG II transport stream is to be transmitted at 7 Mbit/s, 12 Mbit/s have actually to be reserved.

Since network resources in a wireless network are particularly scarce, a more efficient wireless bandwidth reservation mechanism than that of IEC 61883 is required.

The object of the invention is a method for reserving isochronous resources in a wireless network comprising at least a source device and a sink device, said wireless network being based on a TDMA frame transmission scheme, said method comprising the steps of:

providing an output plug in said source device, said output plug being associated with an output plug register, wherein said output plug register defines a maximum amount of data output by said output plug during a frame;

reserving an amount of bandwidth corresponding to said maximum amount of data with an isochronous resource manager of the wireless network.

The amount of bandwidth to be reserved over the wireless link is based on the characteristics (e.g. duration) of the wireless frame, and thus not dependent on cycles on wired busses or other media used to provide data to be transmitted to the source device.

In the case of the HIPERLAN 2 wireless link, the frame duration of 2 ms is used, instead of the IEEE 1394 125 µs cycle.

Isochronous traffic is generally bursty: taking the example of a MPEG2 partial stream, the burstiness of the partial stream depends on the MPEG2 TS packet location within the complete MPEG2 TS. IEC 61883 specifies a packet fragmentation method in order to smoothen the data rate, so that some data can be sent every 1394 cycle. Nevertheless, since the reserved bandwidth in a 1394 bus is expressed as a maximum number of data quadlets to be sent within 125 µs, traffic bursts imply bandwidth waste due to the short duration of the 1394 cycle.

For example, an isochronous stream may generate the following profile:

cycle (N): 1 source packet,
cycle (N+1) 2 source packets,
cycle (N+2): 1 source packet,
cycle (N+3) 2 source packets,
. . .

In this example, the amount of reserved bandwidth over a 1394 bus shall be 2 source packets per 125 µs, which gives a bandwidth to be reserved of 2*192*8/0.125=25.576 Mb/s (without the CIP and 1394 overhead).

If we increase the time interval on which the maximum number of data quadlets to be sent is calculated for the same kind of bursts, then the maximum number of data quadlets to be sent decreases. When the time interval is infinite, then the bandwidth to be reserved (maximum number of quadlets within one period divided by the period) converges towards the average bit rate.

Taking the previous example if we calculate the bandwidth to be reserved as the maximum number of quadlets to be sent over 2 ms, we get the following:

2 ms=16 125 µs cycles

Thus in 2 ms, we will have 24 source packets, which gives a bandwidth to be reserved of 24*192*8/2=18.432 Mb/s (not counting the CIP and 1394 overhead).

Thus increasing the time interval on which the maximum number of data is calculated for a given type of burst gives a more averaged value, therefore a smaller value.

According to an embodiment of the invention, a maximum amount of data is defined in units larger than quadlets.

In particular, these units may be of 48 bytes, representing the payload of SAR layer Service Data Units.

According to an embodiment of the invention, the wireless network is a HIPERLAN 2 network, and wherein data to be sent over the wireless network is provided to said source device over a wired bus in isochronous data packets having a duration smaller than that of a frame of the wireless network.

Other characteristics and advantages of the invention will appear through the description of a non-limiting embodiment, described with the help of the following figures:

FIG. 3 represents the format of an output plug control register according to the prior art, FIG. 4 represents the format of an output plug control register according to the present embodiment.

Figure 1:
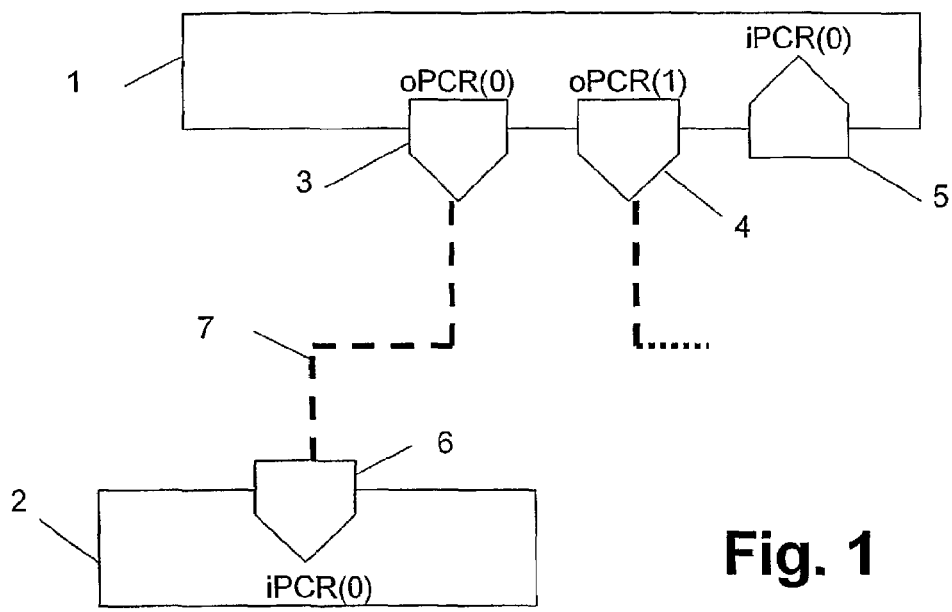
FIG. 1 is a diagram representing a wireless network with two devices.

The wireless network of FIG. 1 comprises audio/video devices 1 and 2. The device 1 has two output plugs, respectively 3 and 4, and one input plug 5. Device 2 has only one input plug 6. Both devices are wireless devices and connected to a HIPERLAN 2 network. A corresponding plug control register (oPCR(x) or iPCR(y)) is associated with each plug.

Figure 2:
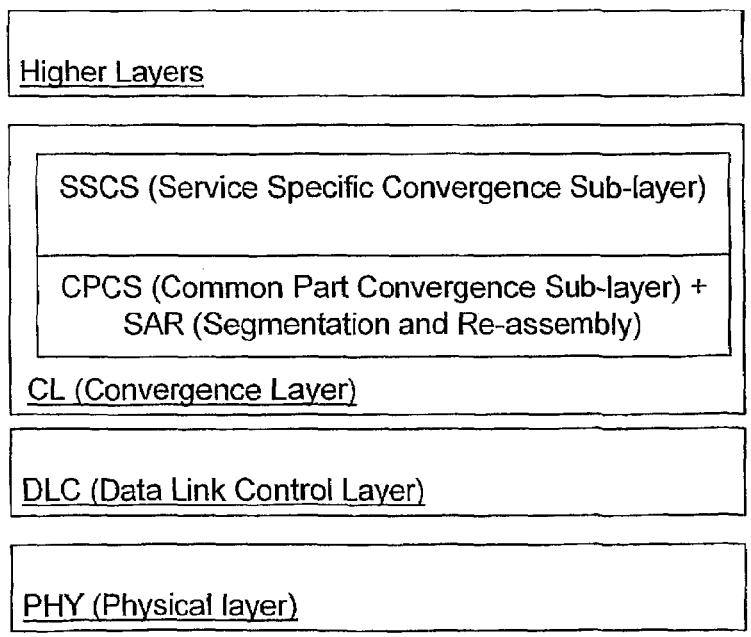
FIG. 2 is a diagram of the Hiperlan 2 protocol stack of each device, this stack being, as such, prior art.

FIG. 2 represents the protocol stack of each of the devices 1 or 2. This stack comprises a physical layer, a data link control layer and a convergence layer. The convergence layer comprises a part common to the convergence layers of all HIPERLAN 2 devices. This part is named CPCS, for Common Part Convergence Sub-layer. Another common part is the Segmentation and Re-Assembly part (SAR). The SAR segments the packets received from the CPCS into fixed size data units and passes them to the data link control layer.

The stack also comprises a Service Specific Convergence Sub-layer (SSCS). The role of this layer is to map specific requirements of the higher layers to the services offered by the data link control layer. In this embodiment, this layer is specific to IEEE 1394 and IEC 61883 (although the invention is also applicable to different environments). Other SSCS may cohabit with the IEEE 1394 SSCS.

The higher layers comprise for example an IEEE 1394 application.

In what follows, the acronyms SDU and PDU will be used. These acronyms respectively designate Service Data Units and Protocol Data Units. The SDU of a layer, for example the SSCS SDU, can be described as the data packet format between the SSCS layer and the layer above the SSCS layer, while the PDU of a layer designates the data packet format for exchange with a lower layer.

According to the invention, a plug control register comprises an item determining the maximum quantity of data which a plug may output or absorb during a period of 2 ms—i.e. the wireless frame period—instead of during the IEEE 1394 125 μs cycle time.

This enables an IEEE 1394 application to examine the contents of a register and to make the appropriate bandwidth reservation in the HIPERLAN network. One method to carry out such a reservation is described in the European patent application 00400220, filed on Jan. 27, 2000 in the name of THOMSON multimedia, and the corresponding PCT application EP01/00941, filed on Jan. 26, 2001.

Preferably, in order to remain close to the principles of IEC 61883, the maximum quantity of data in the plug control registers for HIPERLAN 2 is expressed in quadlets.

FIG. 3 illustrates the format of an output plug control register according to IEC 61883. The signification of the different fields is as follows:

The on-line bit indicates whether the corresponding output plug is online (value one) or off-line (value zero).

The broadcast connection counter indicates whether a broadcast-out connection to the output plug exists (value one) or not (value zero).

The point-to-point connection counter indicates the number of point-to-point connections to the output plug.

The use of the reserved bits is not defined for the moment.

The channel number indicates the actual channel number used by the output plug.

The data rate indicates the actual data rate used by the output plug (i.e. S100, S200 or S400 according to the IEEE 1394 terminology).

The payload indicates the maximum number of payload quadlets that the output plug shall transmit in one isochronous packet.

The overhead ID indicates the maximum number of overhead quadlets that the output plug shall transmit in one isochronous packet As can be seen on FIG. 3, this last item is coded on 10 bits for IEC 61883. While this is sufficient for a 125 μs cycle, it is not for a 2 ms frame.

According to the present embodiment, other bits from the oPCR register are used, in addition to the 10 bits of payload field, to extend the possibilities of coding the number of quadlets.

Since the data rate indicated in the OPCR plug is related solely to a IEEE 1394 wired bus, this information is of no meaning in the context of HIPERLAN 2. For this reason, these two bits can be used for the same purpose as the payload field bits. This is true in a purely wireless network (where devices are not connected to a wired bus), but also in case a wireless network is used as a bridge between two—or more—wired busses. Indeed, the transmission rate on each wired bus may be different from that on the other wired busses. The devices 1 and 2 of FIG. 1 may be used as the two portals of a bridge. In this case, the respective devices would be connected to respective wired 1394 busses.

The two reserved bits are also used for the payload coding purpose.

Thus, the maximum number of quadlets in a 2 ms frame may be coded using 14 bits.

FIG. 4 illustrates the format of the new oPCR register.

Of course, the payload field may indicate the required maximum data output of the plug in units different from quadlets.

According to the present embodiment of the invention, the Overhead ID field of the oPCR register is used as defined by IEC 61883.

In this case, the payload field represents the maximum total amount of data which may be output during a 2 ms frame. This includes the 1394 SSCS Service Data Unit (SSCS SDU), the 1394 SSCS Protocol Data Unit (SSCS PDU) overhead added by the SSCS layer, and overhead added by the CPCS/SAR layer. By convention, it does not include the Data Link Control layer overhead.

In this case, there is no constraint as to the number of CPCS packets within one wireless frame overhead (there may be more than one), provided that the overhead due to the CPCS packet headers is reflected in the payload field.

Since the Segmentation and Re-assembly part of the convergence layer segments payloads into 48-byte Service Data Units ('SAR SDUs'), the new payload field uses the size of a SAR SDU as unit instead of quadlets, as a variant of the main embodiment of the invention.

According to a variant embodiment, the Overhead ID field of the oPCR register's use is redefined to correspond to the wireless transmission. The Overhead ID shall define the amount of overhead added by the HIPERLAN 2 packet based convergence layer within a 2 ms frame. (i.e. the SSCS PDU overhead and the CPCS/SAR overhead).

Again, by convention, the DLC overhead is not included.

In this case, the payload field shall contain the maximum number of user data quadlets within a 2 ms frame, i.e. the total amount of SSCS SDU data, without the 1394 SSCS PDU overhead or the CPCS/SAR overhead.

The invention has the advantage of permitting an efficient bandwidth reservation on a wireless network without being restricted by the constraints imposed by the IEEE 1394 125 μs cycle. It also permits the reservation of the maximum bandwidth without the use of a limited number of predetermined, discrete bandwidth values such as those defined by IEC 61883.

The invention claimed is:

1. Method for reserving isochronous resources in a wireless network comprising at least a wireless source device, said method comprising:
    providing an output plug in a wired source device on a wired bus connected to the wireless source device, said output plug being associated with an output plug register defining a maximum amount of data output by said output plug during a frame on the wired bus;
    reserving an amount of bandwidth on the wired bus corresponding to said maximum amount of data to be sent in a frame on the wired bus;
    providing an output plug in said wireless source device, said output plug being associated with an output plug register, wherein said output plug register defines a maximum amount of data output by said output plug during a wireless frame;
    reserving an amount of bandwidth on the wireless network corresponding to said maximum amount of data to be sent in a wireless frame with an isochronous resource manager of the wireless network; and
    providing, from the wired source device to the wireless source device, isochronous data to be sent over the wireless network,
    wherein said wireless network is based on a TDMA frame transmission scheme.

2. Method according to claim 1, wherein the maximum amount of data in an output plug register on the wireless network is defined in units larger than the units used in an output register on the wired bus.

3. Method according to claim 1, wherein the wireless network is a HIPERLAN 2 network.

4. Method according to claim 1, wherein said maximum amount of bandwidth defined in an output plug register in the wireless network comprises overhead data added by SSCS and CPCS layers of the wireless source device.

5. Method according to claim 1, wherein a wired bus frame is shorter than the wireless frame.

6. Method according to claim 1, wherein said output plug register in a device on the wireless network has the format defined by IEC 61883, but in which at least one field indicates the maximum amount of data to be sourced during a HIPERLAN 2 frame.

7. Method according to claim 5, wherein the maximum amount of data to be reserved per wireless frame for transmitting an isochronous stream over the wireless network is equal to the maximum amount of data of this isochronous stream to be transferred in a time interval of the same length as a time interval for transmitting the wireless frame on the wired network.

8. Method according to claim 1, wherein the wireless network provides a link layer to devices on the wired bus.

9. Method according to claim 1, wherein the reservation on the wireless network is made by an application of a device on the wired bus.

* * * * *

UNITED STATES PATENT AND TRADEMARK OFFICE
CERTIFICATE OF CORRECTION

| | | |
|---|---|---|
| PATENT NO. | : 7,586,945 B2 | Page 1 of 1 |
| APPLICATION NO. | : 10/276188 | |
| DATED | : September 8, 2009 | |
| INVENTOR(S) | : Gaedke et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1397 days.

Signed and Sealed this

Twenty-first Day of September, 2010

David J. Kappos
*Director of the United States Patent and Trademark Office*